United States Patent
Balow et al.

(10) Patent No.: US 7,622,197 B2
(45) Date of Patent: Nov. 24, 2009

(54) SEASONED FERROUS COOKWARE

(75) Inventors: Robert A. Balow, Genoa City, WI (US); Donald E. Whyte, Racine, WI (US)

(73) Assignee: Ferroxy-Aled, LLC, Racine, WI (US)

( * ) Notice: Subject to any disclaimer, the term of this patent is extended or adjusted under 35 U.S.C. 154(b) by 85 days.

(21) Appl. No.: 11/561,760

(22) Filed: Nov. 20, 2006

(65) Prior Publication Data

US 2008/0118763 A1 May 22, 2008

(51) Int. Cl.
- B32B 15/04 (2006.01)
- C23C 8/32 (2006.01)
- C23C 8/18 (2006.01)
- C23C 8/56 (2006.01)

(52) U.S. Cl. ............... 428/469; 148/318; 148/319; 148/218; 148/277; 148/242; 428/472.2; 428/698; 220/573.2

(58) Field of Classification Search .................. None
See application file for complete search history.

(56) References Cited

U.S. PATENT DOCUMENTS

| | | | | |
|---|---|---|---|---|
| 1,512 | A * | 3/1840 | Cowan | 105/168 |
| 3,748,195 | A | 7/1973 | Kondo et al. | |
| 3,930,806 | A | 1/1976 | Racz | |
| 4,406,714 | A * | 9/1983 | Bowes et al. | 148/219 |
| 4,496,401 | A | 1/1985 | Dawes et al. | |
| 4,563,223 | A * | 1/1986 | Dawes et al. | 148/217 |
| 4,607,512 | A | 8/1986 | Deville | |
| 4,702,779 | A | 10/1987 | Madsac et al. | |
| 4,738,730 | A | 4/1988 | Ferguson | |
| 4,776,901 | A | 10/1988 | Heminghous | |
| 4,793,871 | A | 12/1988 | Dawes et al. | |
| 4,844,749 | A * | 7/1989 | Foreman et al. | 148/242 |
| 4,881,983 | A * | 11/1989 | Smith et al. | 148/217 |
| 5,022,934 | A | 6/1991 | Schwing et al. | |
| 5,104,742 | A * | 4/1992 | Hayner et al. | 428/461 |

(Continued)

FOREIGN PATENT DOCUMENTS

GB 2383800 * 7/2003

(Continued)

OTHER PUBLICATIONS

ASM Handbook, vol. 4, Heat Treating, Aug. 1991, pp. 376-386, 415-436.*

(Continued)

Primary Examiner—John J Zimmerman
(74) Attorney, Agent, or Firm—Jansson Shupe & Munger Ltd.

(57) ABSTRACT

A method, and an article produced thereby, of providing a corroson-resistant, scratch-resistant, and stick-resistant, surface on a ferrous-metal-containing article, including forming microcavities in a ferrous-metal-containing article surface by ferritic nitrocarburization and seasoning the surface, including a non-stick agent deposited thereon. In preferred embodiments, the surface of the article including the exposed microcavities is oxidized before seasoning. The article includes cookware. Certain preferred embodiments include forming microcavities by ferritic nitrocarburization wherein the article is heated in an atmosphere including ammonia, nitrogen, and carbon-containing gas to a nitriding temperature of between about 800° F. and about 1300° F. for a time of about 0.5 hours to about 10 hours.

47 Claims, 10 Drawing Sheets

U.S. PATENT DOCUMENTS

| | | | |
|---|---|---|---|
| 5,288,340 | A | 2/1994 | Christ et al. |
| 5,456,766 | A | 10/1995 | Beswick et al. |
| 5,545,439 | A | 8/1996 | Deng et al. |
| 5,679,411 | A * | 10/1997 | Hoppe ................ 427/528 |
| 5,714,015 | A | 2/1998 | Lentz |
| 6,080,496 | A | 6/2000 | Hupf et al. |
| 6,197,438 | B1 | 3/2001 | Faulkner |
| 6,328,819 | B1 | 12/2001 | Lerche et al. |
| 6,360,423 | B1 | 3/2002 | Groll |
| 6,406,560 | B1 | 6/2002 | Lerche et al. |
| 6,699,303 | B2 | 3/2004 | Hanz et al. |
| 6,807,897 | B2 | 10/2004 | Birkenbach et al. |
| 2003/0106617 | A1 * | 6/2003 | Black et al. ............ 148/219 |
| 2005/0218004 | A1 | 10/2005 | Charles |
| 2008/0000550 | A1 * | 1/2008 | Holly et al. ............ 148/217 |

FOREIGN PATENT DOCUMENTS

| | | | |
|---|---|---|---|
| JP | 53-23841 | * | 3/1978 |
| JP | 3-219040 | * | 9/1991 |
| SU | 1151590 | * | 4/1985 |

OTHER PUBLICATIONS

Abstract for CN 101422858 A, May 6, 2009, 2 pages.*

* cited by examiner

SEASONED FERROUS COOKWARE

FIELD OF THE INVENTION

The invention relates generally to cookware and specifically to corrosion resistant, scratch resistant and stick resistant ferrous-metal-containing cookware.

BACKGROUND OF THE INVENTION

The use of non-stick surfaces in cookware is well known. Perhaps the oldest type of non-stick cookware is that which is oil-seasoned steel or cast iron cookware. This type of cookware suffers from a number of significant disadvantages. Most importantly, seasoned steel or cast iron cookware is prone to rusting and must not be washed in soapy water so as to prevent the loss of the seasoned surface. Another problem of such cookware is that because iron is a reactive metal, acidic foods should not be cooked in such vessels for long periods of time. Foods high in acid can cause iron to leach from the cookware's surface and consequently affect the taste of food prepared therein and cause health concerns due to ingestion of the leached iron. The surface of such cookware tends to be relatively non-porous. And the hardness of many metal cooking surfaces is relatively poor such that the cookware is susceptible to scratching and subsequent loss of surface seasoning which results in rusting when the cookware is washed in soapy water. Furthermore, such cookware is higher maintenance; because of the cookware's susceptibility to rusting, it is generally unacceptable to wash the cookware in a dishwasher.

The factors that are desirable in high-quality cookware are greatly impacted by the type of metal the cookware is made of and how the cookware has been surface treated to prepare it as a culinary article. In the culinary world, there is an on-going search for improved cookware that does not suffer from the disadvantages described herein. There remains a constant demand for new and improved culinary articles that have increased corrosion-resistance and stick-resistance in particular. There is also a constant demand for culinary articles that have not been treated with coatings which may be hazardous to one's health. Chefs are on a constant quest for culinary articles that will last longer and that will be easier to care for. Given the above considerations, it is therefore an object of this invention to provide a method of providing an improved seasoned surface on ferrous cookware that has significantly improved corrosion, abrasion and stick resistances

OBJECTS OF THE INVENTION

It is an object of this invention, in the field of ferrous cookware, to provide an improved seasoned surface having improved corrosion, abrasion, and stick resistance.

Another object of the invention is to provide stick-resistant cookware having increased service life.

It is yet another object of the invention to provide a stick-resistant cooking surface that operates as a barrier between food and the metal cooking surface.

Still another object of the invention is to provide an improved method for providing an improved corrosion-resistant cookware surface.

SUMMARY OF THE INVENTION

There are many different known processes used for the surface treatment of ferrous metals. For example, well known in the art are carburizing, nitriding, carbonitriding and nitrocarburizing, boriding, oxide coatings, and thermoreactive diffusion (just to name a few). The method of the present invention is one, most generally, of carbonitriding and nitrocarburizing. This type of process is a diffusion-based surface treatment that takes advantage of the synergistic effect of carburizing and nitriding. More specifically, the invention employs the process of nitrocaburization.

The main objective of nitrocarburization is to increase the hardness of the surface by diffusing it with nitrogen and carbon. Two types of nitrocarburization are austenitic and ferritic. Austenitic nitrocarburizing causes the formation of carbonitrides at the surface to improve hardness levels. Generally temperatures over 1300° F. are used during austenitic nitrocarburizing. Ferritic nitrocarburization, on the other hand, creates both carbonitrides and diffusion of carbon and nitrogen into the substrate metal. Ferritic nitrocarburization typically involves temperatures less than 1300° F. It is ferritic nitrocarburization that is one crucial component of the method of this invention.

Ferritic nitrocarburization involves the diffusion of both nitrogen and carbon into the surface of a substrate metal. This process is long known in the art. It typically involves heat treating a ferrous article from about 1000° F. to about 1200° F. The purpose of the process is to diffuse nitrogen and carbon atoms into the iron, forming a solid solution and thereby entrapping diffused atoms in the spaces in the iron structure.

There are numerous methods that may be used to carry out ferritic nitrocarburization. Among them, and perhaps most early used to effect ferritic nitrocarburization, is the method of using low-temperature (900° F. to 1100°F.) fused salt baths containing cyanide salts to surface harden steel parts in the ferrite region. Pulsed plasma technology is another method known in the art. The known advantages of ferritic nitrocarburization include improved resistance to wear, fatigue, and corrosion due to the introduction of nitrogen and carbon into the surface of the metal substrate.

According to the invention, the method of providing an improved seasoned surface on a ferrous-metal-containing article, This method is characterized primarily by the following steps:

a) forming microcavities in a ferrous-metal-containing article surface by ferritic nitrocarburization, b) seasoning the ferritic nitrocarburized surface and exposed microcavities including a non-stick agent deposited thereon thereby providing a surface with improved corrosion, abrasion, and stick resistant surface on the article; and c) heating the article having the seasoned surface.

The ferrous-metal-containing article of this invention is cookware. In preferred embodiments, cookware includes pots, pans, frypans, skillets, griddles, woks, double boilers, dutch ovens, grills, cooking sheets, cooking pans, burner racks, oven racks, deep-fry baskets, rotisseries and similar culinary articles. Cookware may also include utensils. The ferrous-metal containing article has at least about 65% iron. The article may be made of cast iron, low and high alloy steels, stainless steel, plain carbon steel, aluminized steel and combinations thereof.

Most preferably, the first step of ferritic nitocarburization begins by heating the article in an atmosphere comprising ammonia, nitrogen, hydrogen and carbon-containing gas to a nitriding temperature of between about 800° F. and about 1300° F. In highly preferred embodiments, the article is heated in an atmosphere comprising ammonia, nitrogen, hydrogen and carbon-containing gas to a nitriding temperature of between about 1000° F. and about 1100° F. The source of hydrogen may be from dissociated ammonia. In certain of these preferred embodiments, the atmosphere contains: about 35% to about 60% by volume ammonia gas; about 45% to about 65% by volume nitrogen; and about 3% to about 8% by volume carbon-ontaining gas. The carbon-containing gas can be methane, ethane, butane, pentane, propane, endothermic gas, exothermic gas, carbon monoxide and carbon dioxide, and combinations thereof. During the process of ferritic nitrocarburization, the atmosphere is preferably essentially free of elemental oxygen and the process is carried out at substantially atmospheric pressure. In highly preferred embodiments, the article is heated at the nitriding temperature for about 0.5 to about 10 hours. In preferred methods, the article is heated at the nitriding temperature for about 2 to about 4 hours.

The step of forming microcavities by ferritic nitrocarburization may be carried out in other, though less preferred, ways. One suitable method of forming microcavities on the surface of the article by ferritic nitrocarburization is by subjecting the article to ion-nitriding in a partial vacuum. Yet another acceptable process involves exposing the article to a fluidized bed nitriding furnace in a bed of refractory particles wherein the chamber is pressurized from about 1 to about 4 bar. Still another process for ferritic nitrocarburization that may be used includes subjecting the article to a molten salt bath. The molten salt bath comprises cyanide or cyanate salts.

In a highly preferred embodiment, the method further includes the step of oxidizing the surface including the microcavities after forming the microcavities in the ferrous-metal-containing article surface by ferritic nitrocarburization. Oxidation increases adhesion of the non-stick agent to the surface of the article. In highly preferred embodiments, oxidation is carried out by exposing the article to air, steam or warm, moist air for about 2 to about 30 minutes at about 500° F. to about 1000° F. In another embodiment, the step of oxidation includes submerging the article in a molten salt bath at about 400° F. to about 1000° F. for a time sufficient to impart a thin black iron oxide film on the surface of the article and then rinsing the article. In most highly preferred embodiments, the oxidation step results in imparting a black iron oxide film to the surface of the article, said surface having a thickness of about 0.3 µm to about 1.3 µm.

Next, in most highly preferred embodiments, the step of seasoning is carried out. Seasoning includes applying the non-stick agent to the heated or unheated article surface, heating the applied non-stick agent and article surface for a time sufficient to bond the non-stick agent to the surface, and removing any unbonded non-stick agent. Most preferably, the applied non-stick agent and article surface is heated at a temperature within the range of about 300° F. to about 500° F. for about 10 minutes to about 60 minutes. A sufficient amount of non-stick agent is applied so that substantially all of the microcavities are filled with the agent. In preferred embodiments, the non-stick agent is one or more of animal-based cooking oils, plant-based cooking oils, and synthetic edible oils. In highly preferred embodiments, the plant-based cooking oils are olive oil, soybean oil, canola oil, corn oil, sunflower oil, peanut oil, grape seed oil, safflower oil, cashew oil, seasame oil, rice bran oil, and combinations thereof. In most preferred embodiments, the plant-based cooking oil is grape seed oil.

The present invention also includes the articles formed by the process. The method results in a cookware article which has an improved corrosion-resistant, abrasion-resistant, and stick-resistant surface. The culinary article itself has a ferrous-metal-containing cooking surface defining microcavities formed therein by ferritic-nitrocarburization and a non-stick film bonded to the surface layer. The culinary article is a pot, pan, frypan, skillet, griddle, wok, grill, double boiler, dutch oven, fork, knife, spoon, spatula, cooking sheet, cooking pan, burner rack, deep-fry basket, rotisserie, whisk, ladle, skimmer, tongs, and similar culinary articles.

In highly preferred embodiments, the cooking surface has a thickness of at least about 0.025 inch to about 1.0 inch.

In most preferred embodiments, the culinary article has an oxidation layer on the surface and the exposed microcavities. The oxidation layer is a thin tightly adherent layer comprised substantially of black iron oxide and has a thickness of about 0.3 µm to about 1.3 µm. Where the surface has an oxidation layer, the non-stick agent is applied to the oxidation layer.

As used herein, the term "culinary article" is a broad term which means or refers to any implement or article useful in food preparation and/or consumption.

As used herein, the term "cast iron" is a broad term which means or refers to the known six basic types of cast iron, namely grey cast iron, white cast iron, ductile (or nodular) cast iron, malleable cast iron, compacted graphite cast iron and high-alloy cast iron. Cast irons have carbon contents in the about 2% to about 5% range and silicon in the about 1% to about 3% range. Additional alloy elements are restricted or limited to specific ranges along with defined microstructures and heat treatments in order to classify the specific type of cast iron.

As used herein, "alloy steel" means steels (according to the ISO definition) containing significant quantities of alloying elements (other than carbon and the commonly accepted amounts of Manganese, Silicon, Sulfur, and Phosphorus) added to effect changes in mechanical or physical properties. Those containing less than 5% total metallic alloying elements tend to be termed low-alloy steels and those containing more than 5% tend to be termed high-alloy steels.

As used herein, "stainless steel" means a ferrous alloy with a minimum of about 10.05% chromium content.

As used herein, "plain carbon steel" means a type of steel consisting primarily of Iron and Carbon. The steel contains a maximum of about 2% Carbon and only residual quantities of other elements, except those added for deoxidation with Silicon usually limited to 0.6% and Manganese to about 1.65%

As used herein, "aluminized steel" means a type of steel having a thin coating of aluminum.

As used herein, the term "seasoning" means the bonding of an agent (typically cooking oil) to the surface of a culinary article. The process typically involves the application of a light coating of cooking oil and heating the cookware to a temperature (typically around about 350° F.) sufficient to dry or cure the thin film of oil onto the surface of the article.

As using herein, "ion nitriding" (or plasma nitriding) means nitriding processes using high-voltage electrical energy to form a plasma through which nitrogen ions are accelerated to impinge on an article. The ion bombardment of the article heats it, cleans the surface of the article and provides active nitrogen.

The present method and article produced by it provide an improved cookware article having increased corrosion resistance, scratch resistance and stick resistance. Further details, advantages and features of this invention are given by the following description with reference to the enclosed drawings.

DETAILED DESCRIPTION OF PREFERRED EMBODIMENTS

Figure 2:
FIG. 2 is a schematic view of a steel or cast iron pan.
Figure 3:
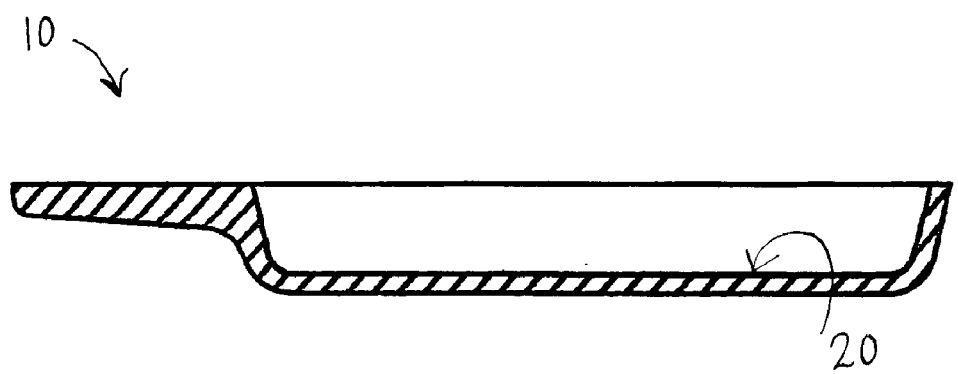
FIG. 3 is a cross-sectional view of the pan of FIG. 2.
Figure 4:
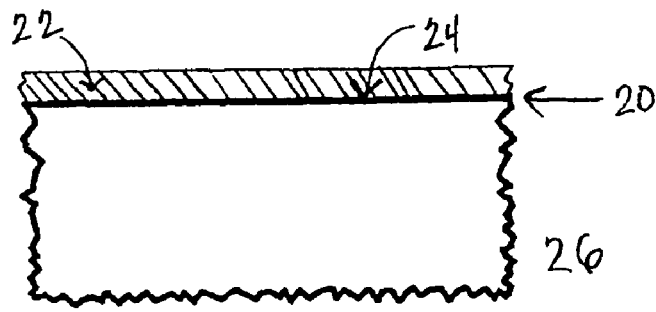
FIG. 4 a magnified section of the pan of FIG. 2 that has been seasoned in the conventional manner.

Referring to FIGS. 2 and 3, a typical steel or cast iron pan 10 is shown. FIG. 3 is a cross-section of the pan 10. FIG. 4 illustrates a magnified cross-section of the surface 20 of the pan that has been seasoned in the conventional manner. As shown, there is a bonded oil seasoned film 22 on the cooking surface 20 of the pan that has been seasoned in a conventional manner. An interface 24 is shown where the oil seasoned film 22 attaches, or bonds, to the top surface 20 of the ferrous pan. There is also shown a portion of the underlying ferrous metal 26 cross-section of the pan.

Figure 1:
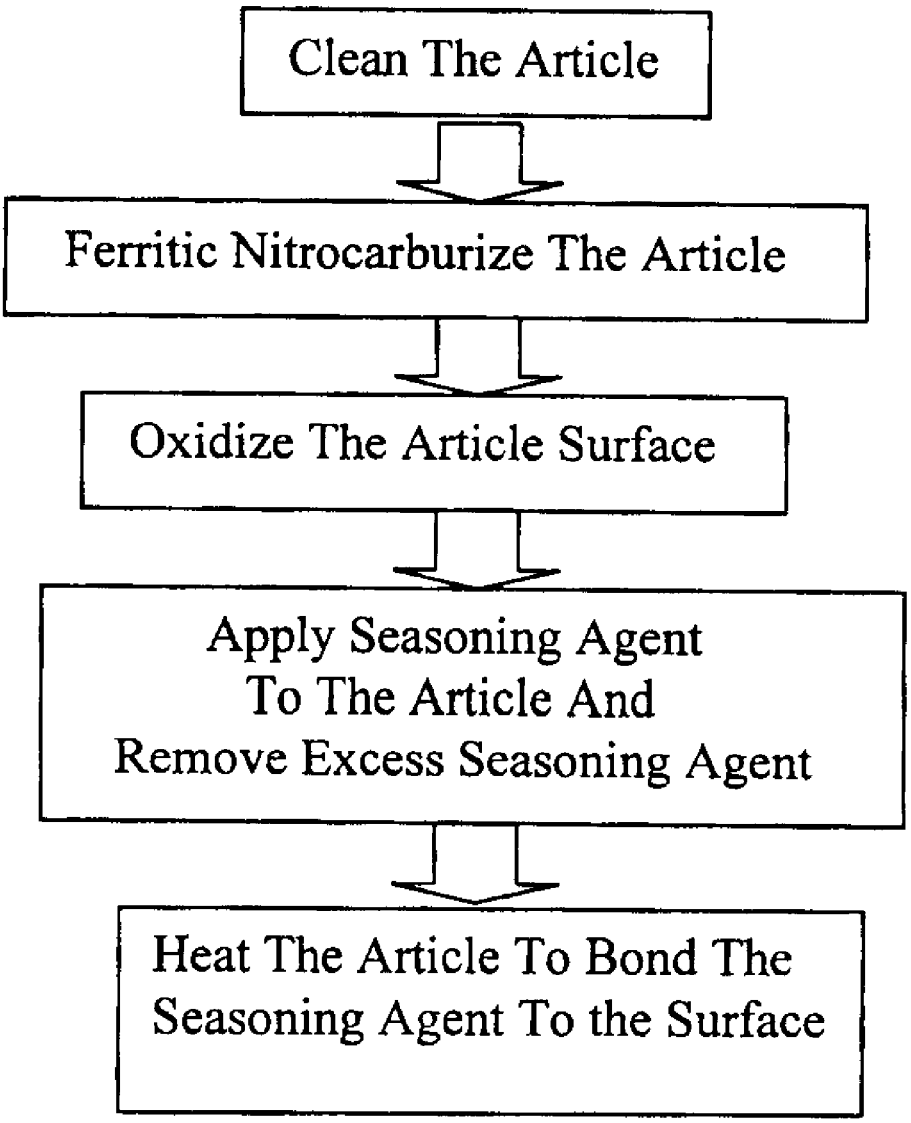
FIG. 1 is a flow chart of a method of providing improved seasoned ferrous cookware in accordance with an embodiment of the present invention.
Figure 5:
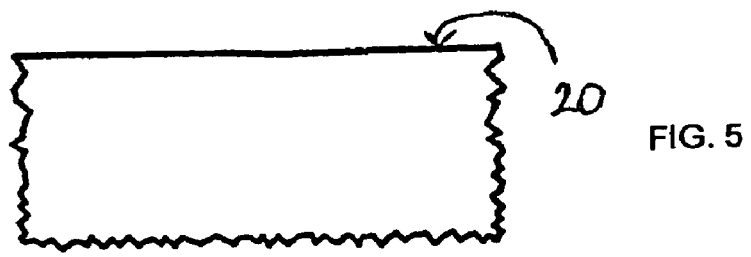
FIG. 5 is a portion of the pan of FIG. 2, wherein the surface is clean and unseasoned according to one step in the flow chart of FIG. 1.

Turning to FIG. 1, a flow chart is shown illustrating the exemplary steps of a preferred embodiment of the method wherein a stick-resistant surface on a ferrous-metal containing article is provided. FIGS. 5-8 illustrate the preferred steps of the process disclosed in the flow chart. As shown, the process preferably begins by cleaning the ferrous-metal containing article. FIG. 5 shows a magnified cross-sectional view of the pan surface 20 and underlying ferrous metal 26. The clean, unseasoned metal pan surface 20 is shown.

Figure 6:
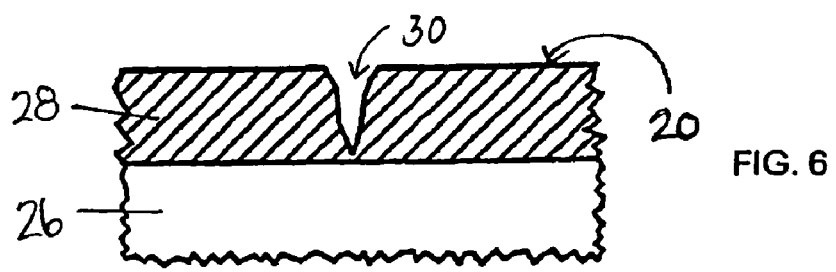
FIG. 6 shows a portion of the pan of FIG. 2, wherein the surface has been ferritic nitrocarburized according to one step in the flow chart of FIG. 1.

Next, FIG. 6 illustrates the second step in the preferred embodiment in which the pan is ferritic nitrocarburized thereby generating a porous compound layer 28 throughout the entire surface 20 of the pan. Porous channels 30, or micropores, are created in this step, which extend down from the top most portion of the surface 20 and into the compound layer 28. The underlying ferrous metal 26 in the pan remains unchanged.

Figure 7:
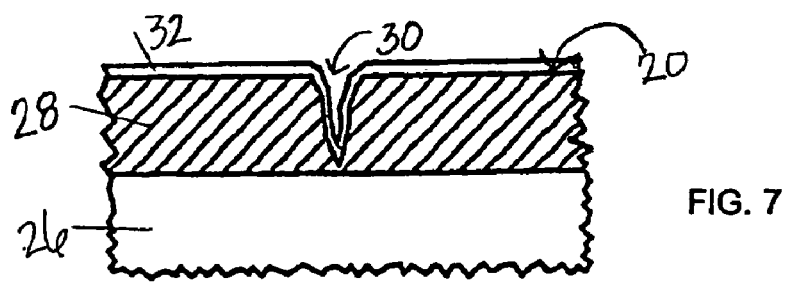
FIG. 7 shows a portion of the pan of FIG. 2, wherein the surface has been ferritic nitrocarburized and oxidized according to one step in the flow chart of FIG. 1.

The next step of the preferred process is illustrated in FIG. 7. The surface 20 of the ferritic nitrocarburized pan is oxidized, whereby a thin iron oxide layer 32 is created on the surface 20 of the pan.

Figure 8:
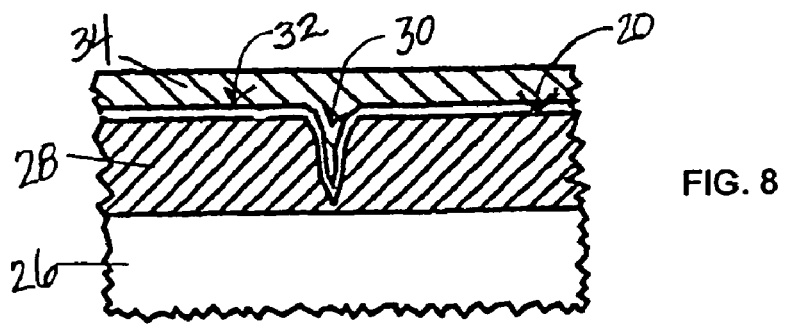
FIG. 8 shows a portion of the pan of FIG. 2, wherein the surface has been ferritic nitrocarburized, oxidized and seasoned according to one step in the flow chart of FIG. 1.

Finally, in the preferred embodiment, as shown in FIG. 8, the surface of the ferritic nitrocarburized and oxidized pan is seasoned. This step includes application of the seasoning agent, removal of any excess seasoning agent and heating of the pan to bond the seasoning agent to the surface of the pan. The non-stick agent 34 bonded to the surface of the ferritic nitrocarburized and oxidized pan is shown in FIG. 8. It is also shown that the non-stick agent when applied substantially fills the microcavities 30.

EXAMPLES

The process according to the preferred embodiment as described above (and in FIGS. 1 and 5-8) was carried out and is illustrated in FIGS. 9-12. Steel and cost iron pans were processed according to the preferred embodiments of the improved seasoning process. The pan surfaces were cleaned with fine steel shot in preparation for ferritic nitrocarburization. The pans were ferritic nitrocarburized at 1060° F. for 3 hours at temperature in an atmosphere of 55% nitrogen, 41% ammonia and 4% carbon dioxide. The pans were then cooled to 800° F. and the atmosphere purged with nitrogen before adding 5% air to the nitrogen to oxidize the surface of the pans. The pans were removed from the furnace when the temperature reached 400° F. When the pans had cooled to about 120° F., grape seed oil was applied to the entire pan surfaces. The excess oil was removed and the pans were heated to 500° F. for 45 minutes and air cooled to complete the seasoning process.

Figure 9A:
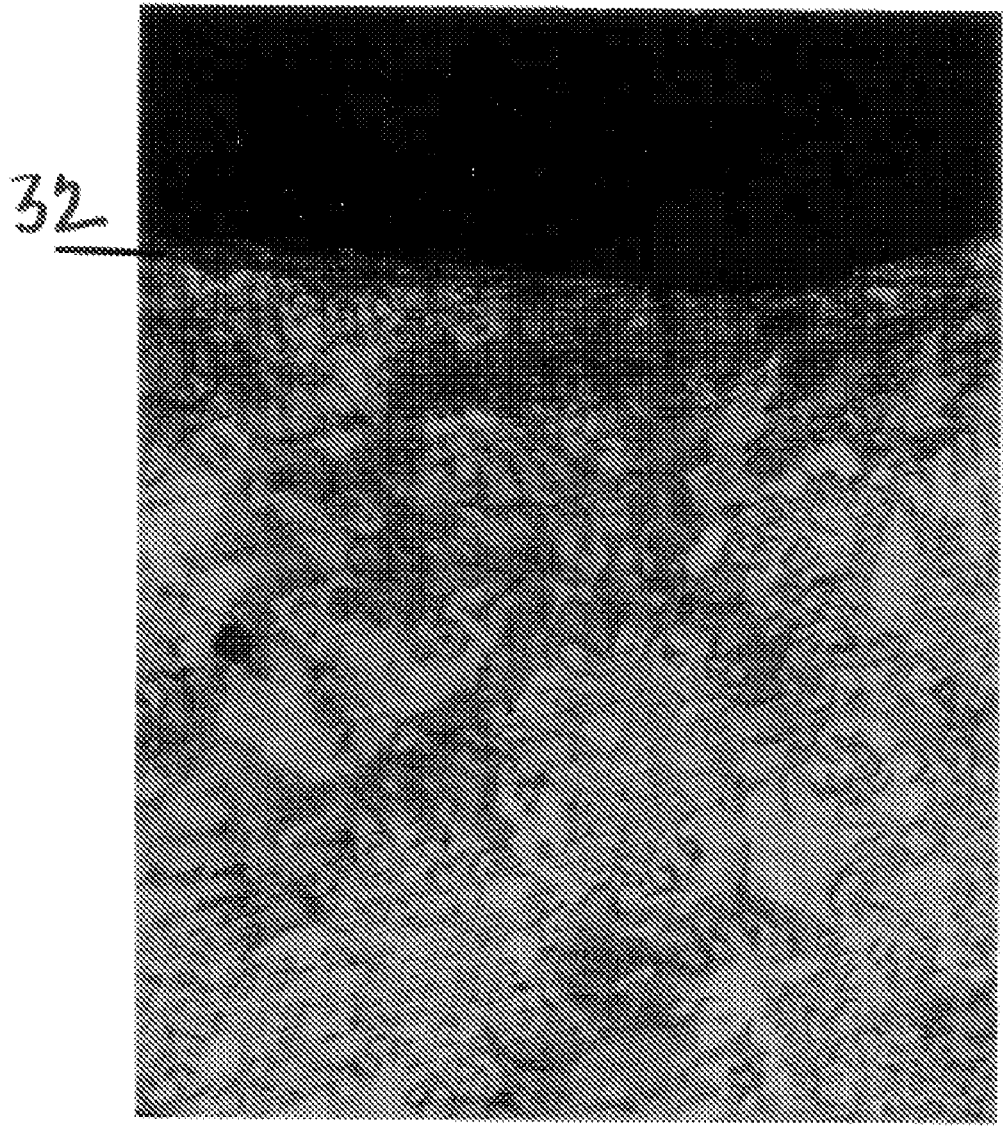
FIG. 9 is a photomicrograph of a cast iron article before and after ferritic nitrocarburization (9A and 9B, respectively).
Figure 9B:
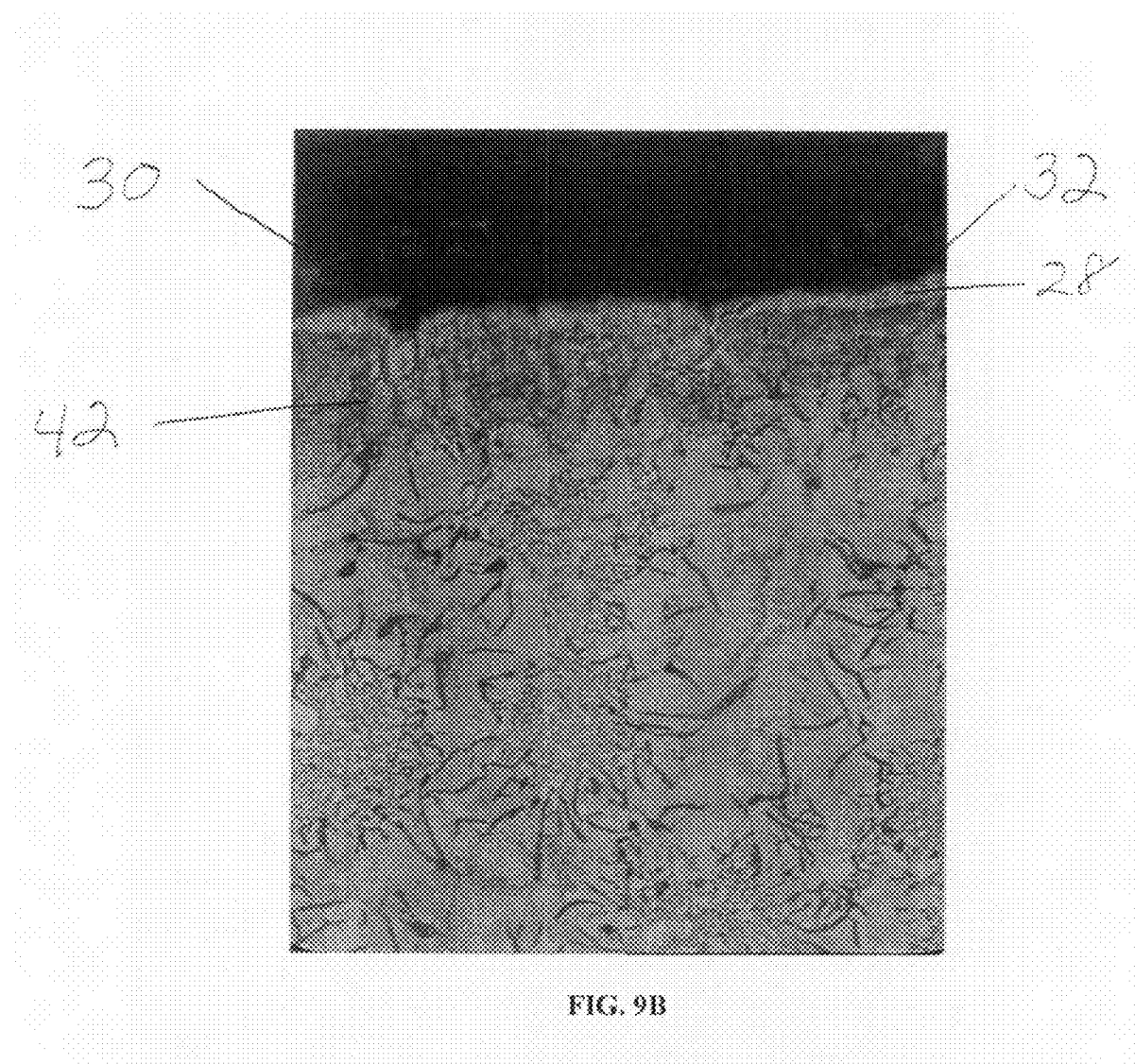

FIG. 9 shows the cooking surface and underlying microstructure of a cast iron pan compared to the conventional seasoned process and with the improved seasoned process. More specifically, FIG. 9A shows a conventional seasoned cast iron pan with a thin dark oxide surface layer 32 and a sub-surface microstructure of fine graphite, ferrite and pearlite grains. FIG. 9B shows the improved cast iron microstructure consisting of a thin dark oxide layer 32 on top of the white ferritic nitrocarburized porous surface 28. The sub-surface consists primarily of dark graphite flakes, pearlite and ferrite. Also shown are microcavities in the shape of channels 30 and spheroidal microcavities 42.

Figure 10A:
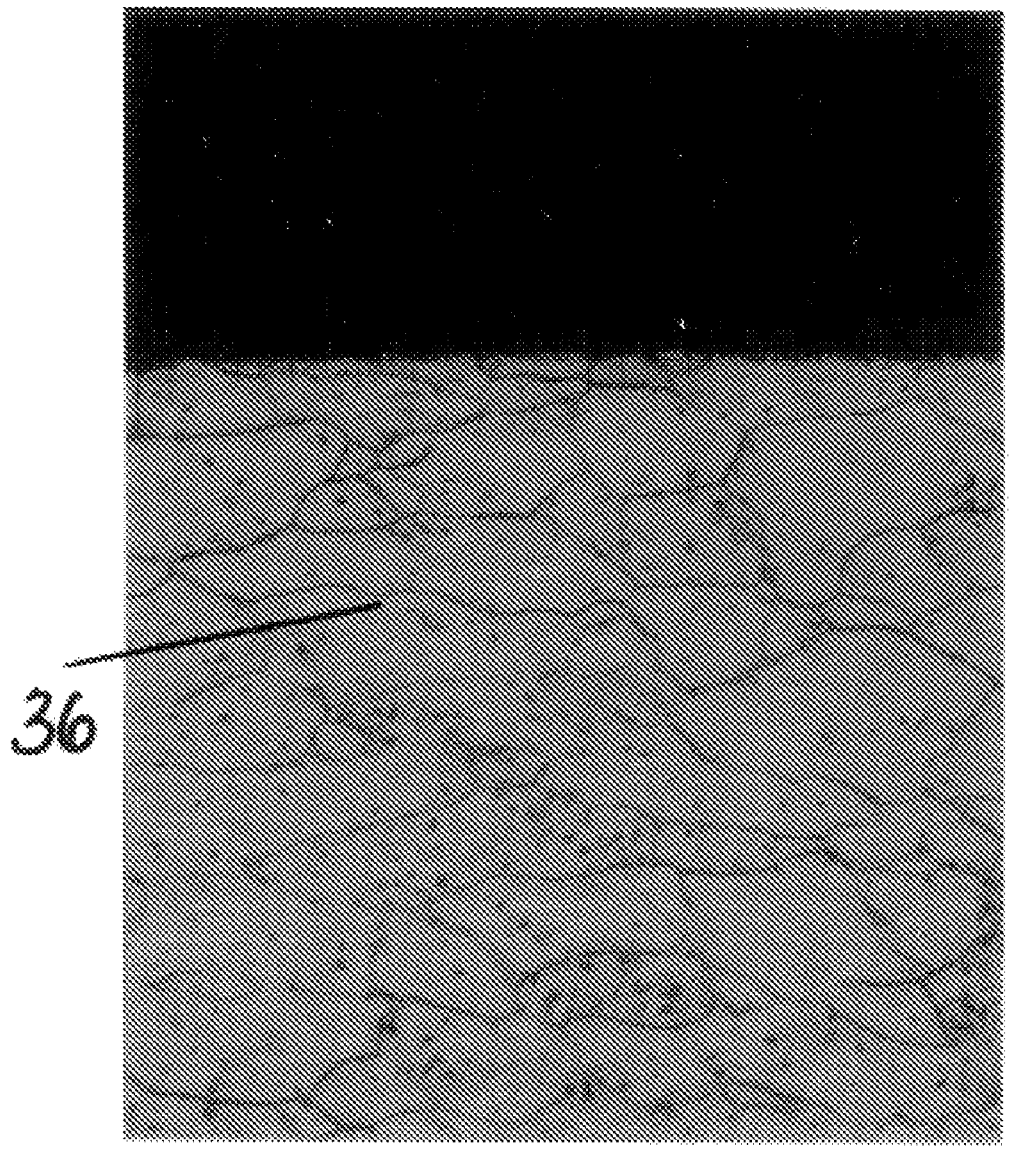
FIG. 10 is a photomicrograph of a steel article before and after ferritic nitrocarburization (10A and 10B, respectively).
Figure 10B:
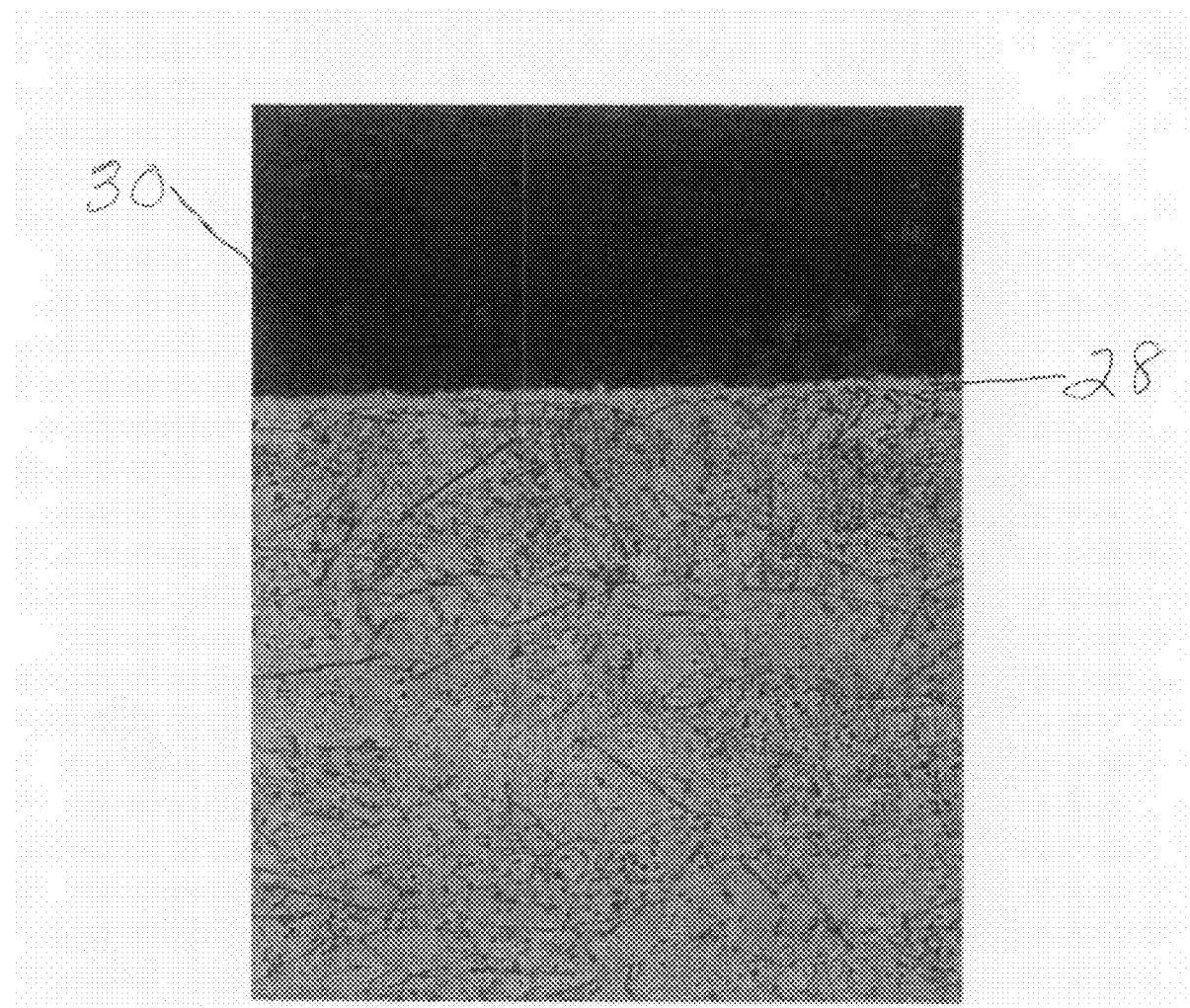

FIG. 10 shows the cooking surface and underlying microstructure of a steel pan compared to the conventional seasoned process and with the improved seasoned process. Specifically, FIG. 10A shows a conventional seasoned steel pan with no visible surface structure on the elongated low carbon ferrite grains 36. FIG. 10B shows the improved seasoned steel microstructure with the thin white ferritic nitrocarburized compound surface layer 28 and a sub-surface structure of diffused nitrogen in low-carbon iron. Again microcavities 30 are shown.

Figure 11:
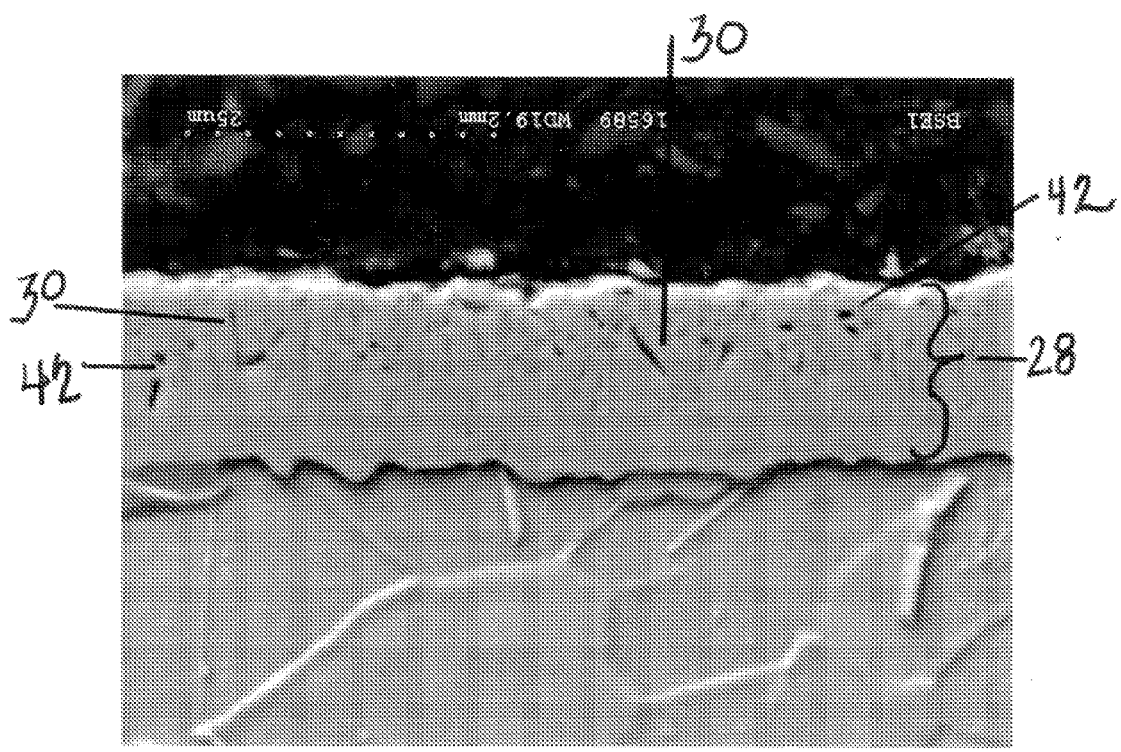
FIG. 11 is a scanning electron microscopic (SEM) photomicrograph of the porous surface of an article after ferritic nitrocarburization.

FIG. 11 is a scanning electron microscope photograph of the ferritic nitrocarburized layer in the steel pan surface of FIG. 10B. The high magnification reveals numerous channel-like 30 and spheroidal 42 porosity in the steel surface that were not visible in the lower magnification shown in FIG. 10B. The ferritic nitrocarburized layer 28 is easily seen. The channel porosity create a capillary action to pull the seasoning agent into the ferrous metal surface and tightly bond the seasoning agent to the surface.

Figure 12:
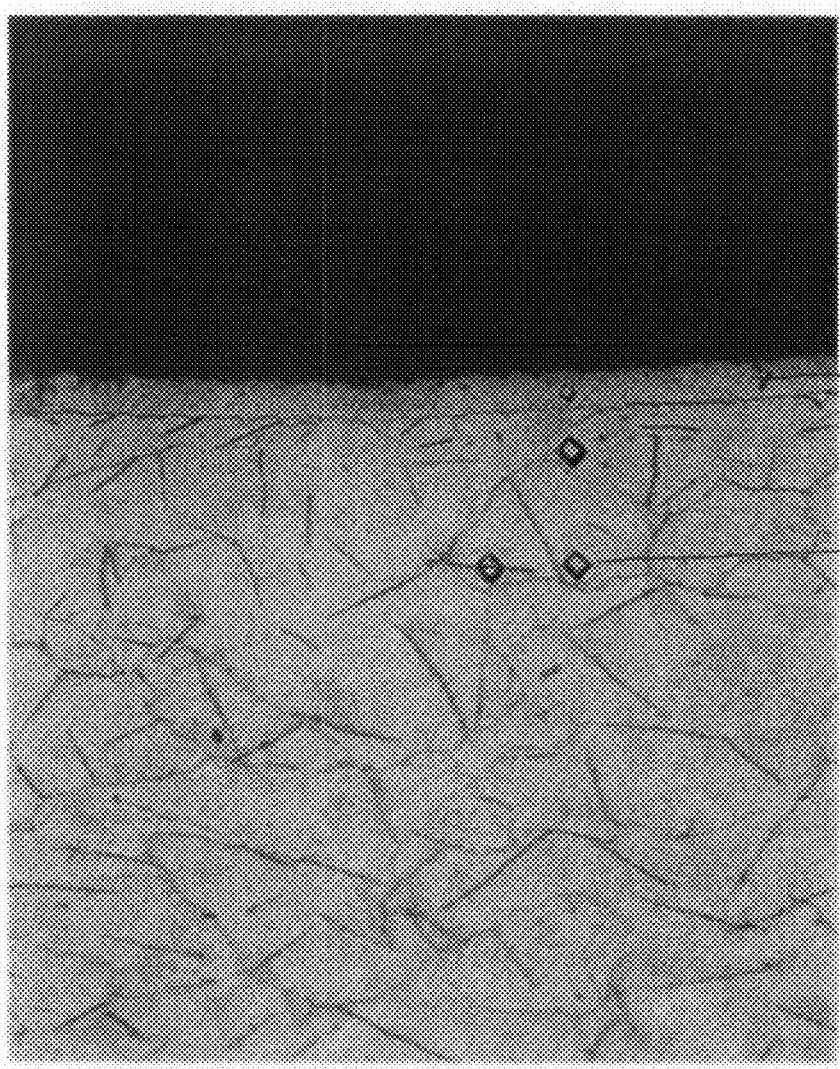
FIG. 12 is a photomicrograph of microhardness tests on the surface of a steel article that has been ferritic nitrocarburized.

FIG. 12 shows the results of a micro-hardness test performed on the surface and underlying sub-surface of the steel pan also shown in FIGS. 10B and 11. The micro-hardness impressions were made by a diamond pyramid indenter with a 25 gram load. The hardness impressions illustrate the significant increase in surface hardness of the ferritic nitrocarburized compound layer 28 over the softer sub-surface 26. Several surface hardness readings were taken with a microfical tester using a 1000 gram load and a diamond pyramid indenter. The conventional seasoned pan had a surface hardness of about 120 hardness Vickers (HV) and the improved seasoned pan had a hardness of about 350 HV. The increased surface hardness adds significant scratch resistance to the cooking surface of the pan. Where the cooking surface has improved scratch resistance, its corrosion-resistance is likewise increased.

Figure 13:
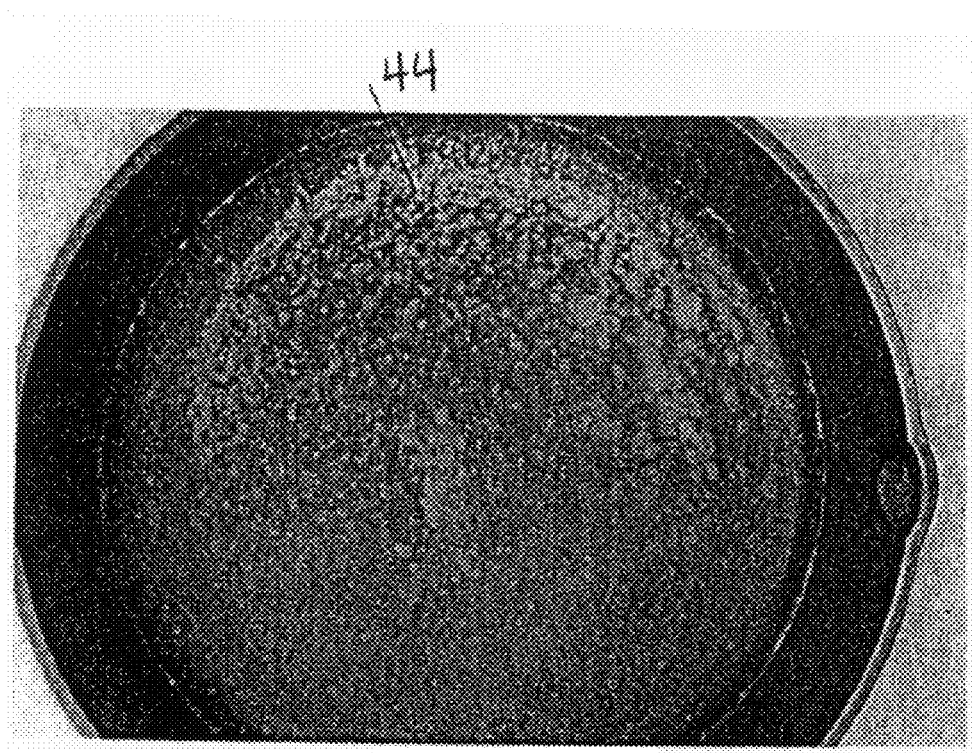
FIG. 13 is a photograph of a conventional seasoned cast iron pan that has not undergone ferritic nitrocarburization and a corrosion test applied thereto.
Figure 14:
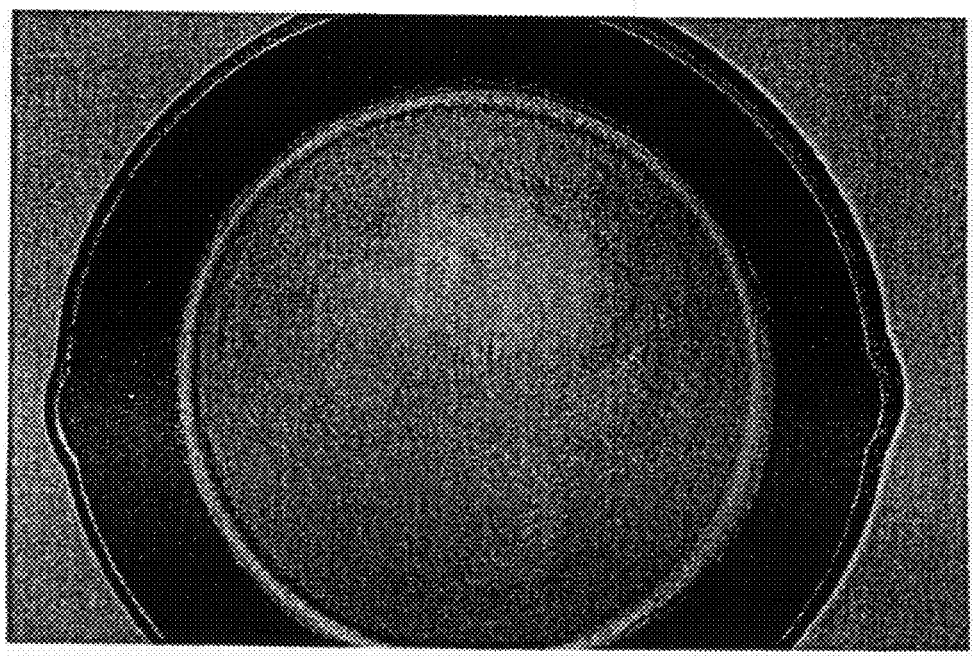
FIG. 14 is a photograph of a cast iron pan following ferritic nitrocarburization and seasoning and a corrosion test applied thereto.

Finally, as shown in FIGS. 13 and 14 a simple corrosion test was performed to illustrate a comparison of the corrosion resistance in a conventional seasoned pan to that of a ferritic nitrocarburized seasoned pan. Two pans from the same manufacturer were used for the corrosion test. Both pans were filled with about one-half inch water and were left at room temperature until all of the water evaporated. Test results indicated approximately 12% red rust 44 on the conventionally seasoned pan, as shown in FIG. 13. The ferritic nitrocarburized and seasoned pan, shown in FIG. 14, had less than 0.1% red rust.

The invention claimed is:

1. A method of providing a stick-resistant surface on a ferrous-metal-containing culinary article comprising:
   a) forming microcavities in a ferrous-metal-containing culinary article having a food-contact surface by ferritic nitrocarburization; and
   b) seasoning the culinary article food-contact surface including depositing thereon a non-stick agent including one or more of the group comprising animal-based cooking oils, plant-based cooking coils and synthetic edible oils and heating the culinary article food-contact surface, thereby providing a stick-resistant surface on the culinary article.

2. The method of claim 1 wherein the culinary article comprises cookware.

3. The method of claim 2 wherein cookware comprises one or more of a pot, pan, frypan, skillet, griddle, wok, double boiler, dutch oven, grill, cooking sheet, cooking pan, burner racks, oven racks, deep-fry baskets, and rotisseries.

4. The method of claim 2 wherein cookware comprises a utensil.

5. The method of claim 2 wherein the culinary article comprises at least about 65% iron.

6. The method of claim 5 wherein the cookware is of a material comprising one or more of cast iron, low and high alloy steels, stainless steels, plain carbon steels and aluminized steels and combinations thereof.

7. The method of claim 1 wherein forming the microcavities by ferritic nitrocarburization comprises heating the culinary article in an atmosphere comprising ammonia, nitrogen, hydrogen and carbon-containing gas to a nitriding temperature of between about 800° F. and about 1300° F.

8. The method of claim 7 wherein forming the microcavities by ferritic nitrocarburization comprises heating the culinary article in an atmosphere comprising ammonia, nitrogen, hydrogen and carbon-containing gas to a nitriding temperature of between about 1000° F. and about 1100° F.

9. The method of claim 8 wherein the atmosphere comprises:
   between about 35% and about 60% by volume ammonia gas;
   between about 45% and about 65% by volume nitrogen; and
   between about 3% and about 8% by volume carbon-containing gas.

10. The method of claim 9 wherein the carbon-containing gas comprises one or more of methane, ethane, butane, pentane, propane, endothermic gas, exothermic gas, carbon monoxide and carbon dioxide.

11. The method of claim 10 wherein the atmosphere is essentially free of elemental oxygen.

12. The method of claim 11 where forming the microcavities by ferritic nitrocarburization is carried out at substantially atmospheric pressure.

13. The method of claim 7 wherein the culinary article is heated at the nitriding temperature for between about 0.5 hours and about 10 hours.

14. The method of claim 13 wherein the culinary article is heated at the nitriding temperature for between about 2 hours and about 4 hours.

15. The method of claim 1 wherein forming the microcavities by ferritic nitrocarburization comprises subjecting the article to ion-nitriding in a partial vacuum.

16. The method of claim 1 wherein forming the microcavities by ferritic nitrocarburization comprises exposing the culinary article to a fluidized bed nitriding furnace in a bed of refractory particles wherein the chamber is pressurized from between about 1 and about 4 bar.

17. The method of claim 1 wherein forming the microcavities by ferritic nitrocarburization comprises subjecting the article to a molten salt bath.

18. The method of claim 17 wherein the molten salt bath comprises cyanide or cynanate salts.

19. The method of claim 1 further comprising the step of oxidizing the culinary article food-contact surface including the microcavities after forming the microcavities in the ferrous-metal-containing article surface by ferritic nitrocarburization.

20. The method of claim 19 wherein oxidizing comprises oxidizing the article with air, steam or warm, moist air for between about 2 minutes and about 30 minutes at between about 500° F. and about 1000° F.

21. The method of claim 20 wherein the oxidizing comprises imparting a black iron oxide film to the culinary article food-contact surface, said film having a thickness of between about 0.3 µm and about 1.3 µm.

22. The method of claim 19 wherein oxidizing comprises:
   a) submerging the article in a molten salt bath at between about 400° F. and about 1000° F. for a time sufficient to impart a thin black iron oxide film on the surface of the article; and
   b) rinsing the article.

23. The method of claim 22 wherein the black iron oxide film has a thickness of between about 0.3 µm and about 1.3 µm.

24. The method of claim 1 wherein seasoning comprises:
   a) applying the non-stick agent to the culinary article food-contact surface;
   b) heating the applied non-stick agent and said surface for a time sufficient to bond the non-stick agent to the surface; and
   c) removing any unbonded non-stick agent.

25. The method of 24 wherein applying the non-stick agent comprises applying the non-stick agent in an amount sufficient to fill substantially all of the microcavities.

26. The method of claim 25 wherein the applied non-stick agent and culinary article food-contact surface is heated at a temperature of between about 300° F. and about 500° F. for between about 10 minutes and about 60 minutes.

27. The method of claim 1 wherein plant-based cooking oils comprise olive oil, soybean oil, canola oil, corn oil, sunflower oil, peanut oil, grape seed oil, safflower oil, cashew oil, sesame oil, rice bran oil, and combinations thereof.

28. The method of claim 27 wherein the plant-based cooking oil is grape seed oil.

29. A method of providing a stick-resistant surface on a ferrous-metal-containing article comprising:
   a) forming microcavities in a ferrous-metal-containing article surface by ferritic nitrocarburization;
   b) applying a non-stick agent including one or more of the group comprising animal-based cooking oils, plant-based cooking oils and synthetic edible oils to the article surface; and
   c) heating the applied non-stick agent and article surface for a time sufficient to bond the non-stick agent to the surface and removing any unbonded non-stick agent.

30. The method of claim 29 wherein plant-based cooking oils comprise olive oil, soybean oil, canola oil, corn oil, sunflower oil, peanut oil, grape seed oil, safflower oil, cashew oil, sesame oil, rice bran oil, and combinations thereof.

31. The method of claim 30 wherein the plant-based cooking oil is grape seed oil.

32. The method of claim 29 wherein the ferrous-metal-containing article comprises cookware.

33. The method of claim 32 wherein cookware comprises one or more of a pot, pan, frypan, skillet, griddle, wok, double boiler, dutch oven, grill, cooking sheet, cooking pan, burner racks, oven racks, deep-fry baskets, and rotisseries.

34. The method of claim 32 wherein cookware comprises a utensil.

35. The method of claim 29 wherein the ferrous-metal-containing article comprises at least about 65% iron.

36. The method of claim 35 wherein the ferrous-metal-containing article is of a material comprising one or more of cast iron, low and high alloy steels, stainless steels, plain carbon steels and aluminized steels and combinations thereof.

37. The method of claim 29 further comprising the step of oxidizing the article surface including the microcavities after forming the microcavities in the ferrous-metal-containing article surface by ferritic nitrocarburization.

38. A method of providing a corrosion-resistant, stick-resistant surface on a ferrous-metal-containing cookware article comprising:
   a) forming microcavities in a cookware article surface by ferritic nitrocarburization;
   b) applying a non-stick agent including one or more of the group comprising animal-based cooking oils, plant-based cooking oils, and synthetic edible oils to the cookware article surface, thereby providing a non-stick agent film over substantially all of the microcavities deposited thereon and removing any unbonded non-stick agent; and
   c) heating the applied non-stick agent and cookware article surface at a temperature of between about 300° F. and about 500° F. for between about 10 minutes and about 60 minutes.

39. The method of claim 38 wherein plant-based cooking oils comprise olive oil, soybean oil, canola oil, corn oil, sunflower oil, peanut oil, grape seed oil, safflower oil, cashew oil, sesame oil, rice bran oil and combinations thereof.

40. The method of claim 39 wherein the plant-based cooking oil is grape seed oil.

41. A culinary article comprising:
   a) a ferrous-metal-containing surface defining microcavities formed therein by ferritic-nitrocarburization; and
   b) a seasoned non-stick film including one or more of the group comprising animal-based cooking oils, plant-based cooking oils, and synthetic edible oils bonded to the surface of the culinary article, thereby providing a non-stick agent film over substantially all of the microcavities.

42. The culinary article of claim 41 wherein a culinary article comprises pots, pans, frypans, skillets, griddles, woks, grills, double boilers, dutch ovens, forks, knives, spoons, spatulas, cooling sheets, cooking pans, burner racks, deep-fry baskets, rotisserie, whisks, ladles, skimmers, and tongs.

43. The culinary article of claim 41 wherein the ferrous-metal-containing surface has a thickness of at least about 0.025 inch to about 1.0 inch.

44. The culinary article of claim 41 wherein the culinary article comprises at least 65% iron.

45. The culinary article of claim 44 wherein the culinary article comprises one or more of grey cast iron, ductile iron, malleable iron, low and high alloy steels, stainless steel, plain carbon steels, and aluminized steel.

46. The culinary article of claim 41 further comprising an oxidation layer on the surface and the microcavities, wherein the non-stick agent is applied to the oxidation layer.

47. The culinary article of claim 46 wherein the oxidation layer comprises a thin tightly adherent layer comprised substantially of black iron oxide and the oxidation layer has a thickness of between about 0.3 µm and about 1.3 µm.

* * * * *